E. K. COLLINS.
Clover Huller.
No. 25,097.
Patented Aug. 16, 1859.
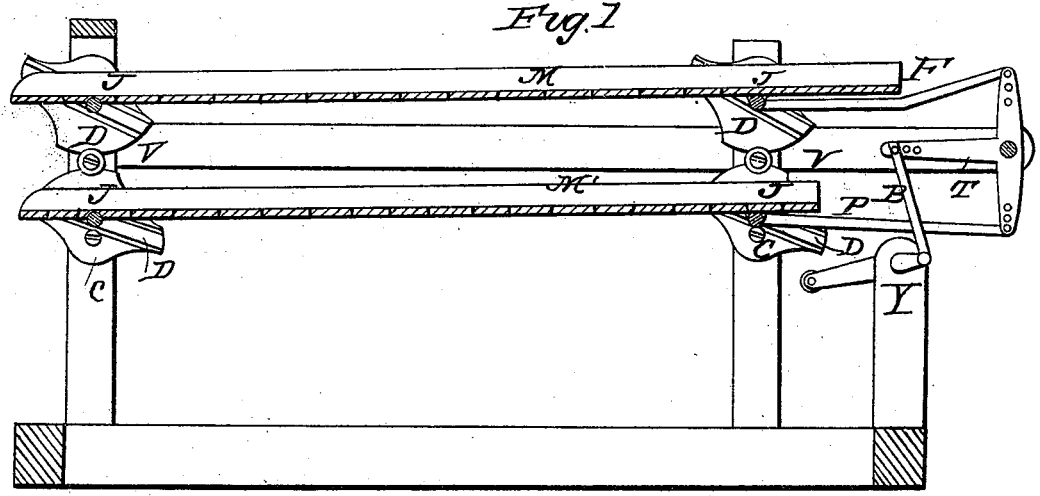
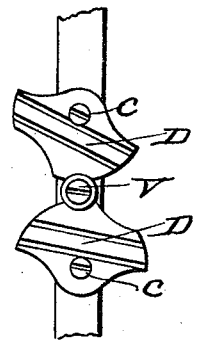
WITNESSES
G. Henry Roberts.
Daniel Degarmo.
INVENTOR
Edward K. Collins.

UNITED STATES PATENT OFFICE.

EDWARD K. COLLINS, OF CHILI, NEW YORK.

CLOVER-BOLT.

Specification forming part of Letters Patent No. 25,097, dated August 16, 1859; Reissued June 7, 1864, No. 1,690.

*To all whom it may concern:*

Be it known that I, EDWARD K. COLLINS, of Chili, in the county of Monroe and State of New York, have invented a new and useful Improvement in Clover-Bolts; and I do hereby declare that the following is a full and exact description thereof, reference being had to the accompanying drawings and to the letters of reference marked thereon.

Figure 1 is a vertical section, showing the arrangement of the parts, Fig. 2 is a side elevation of two of the inclined grooves D, and showing one more inclined than the other.

The nature of my invention consists in the construction and arrangement of two bolts in clover machines so as to give them a counter movement, horizontally, in connection with their upward movement, and also, in the manner of regulating the upward throw of either end of the bolts, by means of the adjustable inclined grooves D.

I construct the bolts M and M' similar to the ordinary single bolt, with cross rods J at each end, their ends projecting sufficiently beyond the sides of the bolts, to work in the grooves D, or there may be studs screwed to the sides of the bolts, instead of the rods J. The plates of the grooves D are made to turn on the screw C when it is necessary to change their inclination, by loosening the set screw V, when either or both may be changed as desired. The upward throw of either end of the bolts may be increased or diminished by this means. The horizontal vibration of the bolts is regulated by changing the connection of the rods F and P to the inner or outer holes of the T. The vibration of both bolts may be increased, or diminished, by changing the connection of the rod B, in the same manner.

One advantage of the counter movement of the bolts, is, that their momentum balances each other, another is, that each bolt prevents the other from becoming " clogged."

I claim—

The combination and arrangement of two bolts in clover machines, when said bolts have a counter and upward movement produced in the manner, and for the purposes specified.

EDWARD K. COLLINS.

Witnesses:
G. HENRY ROBERTS,
DANIEL DEGARINO.